(12) United States Patent
Jiang et al.

(10) Patent No.: US 8,571,127 B2
(45) Date of Patent: Oct. 29, 2013

(54) MIMO TRANSMISSION WITH RANK ADAPTATION FOR MULTI-GIGABIT 60 GHZ WIRELESS

(75) Inventors: Meilong Jiang, Plainsboro, NJ (US); Guosen Yue, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 205 days.

(21) Appl. No.: 13/046,196

(22) Filed: Mar. 11, 2011

(65) Prior Publication Data
US 2011/0222616 A1 Sep. 15, 2011

Related U.S. Application Data

(60) Provisional application No. 61/312,689, filed on Mar. 11, 2010.

(51) Int. Cl.
*H04B 7/02* (2006.01)

(52) U.S. Cl.
USPC ........... 375/267; 375/261; 375/260; 375/259; 375/295; 375/219; 342/373; 342/377; 342/386; 342/372

(58) Field of Classification Search
USPC ........ 375/267, 261, 260, 259, 316, 295, 219; 342/373, 377, 368, 372
See application file for complete search history.

(56) References Cited

U.S. PATENT DOCUMENTS

2009/0051594 A1* 2/2009 Na et al. ................. 342/373
2010/0255790 A1* 10/2010 Farajidana et al. ......... 455/69

\* cited by examiner

*Primary Examiner* — Zewdu Kassa
(74) *Attorney, Agent, or Firm* — Joseph Kolodka

(57) ABSTRACT

A wireless system includes a transmitter with a baseband processor responsive to groups of transmitter antenna arrays for communicating over directional beams; and a receiver with a baseband processor responsive to groups of receiver antenna rays for communicating with the transmitter over the directional beams, the receiver including both a rank adaptation providing a transmit mode feedback to the transmitter and a blind beamforming providing a transmit beamformer index feedback to the transmitter and receiver groups of antenna arrays.

17 Claims, 3 Drawing Sheets

MIMO TRANSMISSION WITH RANK ADAPTATION FOR MULTI-GIGABIT 60 GHZ WIRELESS

This application claims the benefit of U.S. Provisional Application No. 61/312,689, entitled "MIMO TRANSMISSION WITH RANK ADAPTATION FOR MULTI-GIGABIT 60 GHz WIRELESS", filed on Mar. 11, 2010, the contents of which are incorporated by reference herein.

FIELD OF THE INVENTION

The present invention relates generally to wireless communications and, more particularly, MIMO transmission with rank adaptation for multi-gigabit 60 GHz wireless.

BACKGROUND OF THE INVENTION

Recently, there have been extensive advancements in research and standardization to realize multi-Gigabit wireless transmission over 60 GHz carrier such as WirelessHD, WiGig and IEEE802.15.3c. In these standards, beamforming is exclusively considered due to the fact that LoS channels are in general rank deficient and beamforming is efficient to boost signal-to-interference-and-noise-ratio (SINR) for 60 GHz wireless channel with high path loss. Traditional spatial multiplexing techniques operating with rich scattering and multipath for lower carrier frequency is in general not considered in 60 GHz transmission.

The criteria to create high rank MIMO channel in a green field (or LoS) environment has been initially reported and shown that rank properties of LoS wireless link are governed by simple geometrical propagation parameters such as antenna spacing and transmitter-receiver (Tx-Rx) distance. Some recent investigations continued to show that the spatial multiplexing gain can be obtained in LoS channels by employing specifically designed antenna arrays to preserve the orthogonality between antenna signatures. Briefly, high rank or full rank MIMO channel can be created by increasing inter-element antenna spacing and assuming particular geometrical setting (Tx-Rx distance and antenna array orientation). The above exciting works show that the high rank MIMO transmission is theoretically feasible for 60 GHz LoS channel. However, in above works, the knowledge of the exact geometrical placement is required to realize the high rank/full rank MIMO transmission. Thus neither of them has much practical value because the actual placement is very difficult to be predicted and the antenna spacing usually cannot be dynamically adjusted once it is deployed. Moreover, there is no beamforming gain in the proposed approach.

A system architecture supporting a heuristic combination of beam-forming and spatial multiplexing has been disclosed. However, it requires full channel state information at the receiver to derive the transmit and receive beamforming vectors, which is a quite impractical assumption for 60 GHz systems especially for the cases with a large number of transmitter or receiver antennas. Moreover, without rank adaptation capability, this system is quite sensitive to geometrical change, misplacement and human blockage effect. There are also other efforts of creating high rank MIMO in LoS channel, such as the method based on polarization diversity and the repeater-assisted capacity enhancement scheme. However, neither is applicable in practice so far.

Accordingly, there is a need for a practical MIMO transmission with rank adaptation in the 60 GHz wireless radio link.

SUMMARY OF THE INVENTION

In one aspect of the invention, a wireless system includes a transmitter with a baseband processor responsive to groups of transmitter antenna arrays for communicating over directional beams; and a receiver with a baseband processor responsive to groups of receiver antenna rays for communicating with the transmitter over the directional beams, the receiver including both a rank adaptation providing a transmit mode feedback to the transmitter and a blind beamforming providing a transmit beamformer index feedback to the transmitter and receiver groups of antenna arrays.

In an alternative aspect of the invention, a method includes communicating over directional beams by a transmitter with a baseband processor responsive to groups of transmitter antenna arrays; and communicating with the transmitter over the directional beams by a receiver with a baseband processor responsive to groups of receiver antenna rays, the receiver including both a rank adaptation providing a transmit mode feedback to the transmitter and a blind beamforming providing a transmit beamformer index feedback to the transmitter and receiver groups of antenna arrays.

In a preferred embodiment, the blind beamforming includes a stochastic gradient algorithm based blind beam forming that generates enhanced perturbation vectors, an iterative procedure to generate new beamformers responsive to the perturbation vectors and a current beam beamformer, determining a received power for all combination of transmitter and receiver antenna beamformers responsive to the new beamformers, and determining optimal transmit and receive beamformers for updating the current beamformer. This blind beamforming procedure does not require channel state information.

In the preferred embodiment the rank adaptation is responsive to a composite channel estimation with reduced complexity and higher accuracy from improved signal-to-noise-ratio contributed by joint effect of transmitter-receiver beamforming, includes a capacity evaluation responsive to a composite channel gain obtained at the receiver with the transmission being adaptively chosen from one of a high rank spatial multiplexing and a rank-1 beamforming whichever gives higher throughput. The capacity for the high rank spatial multiplexing and the rank1 beamforming is respectively given by $$C_{rankM} = \log_2\left(\det\left(I + \frac{P}{M}\tilde{H}\tilde{H}'\right)\right)$$

and $C_{rank1} = \log_2(1+P|\tilde{u}\tilde{H}\tilde{w}'|^2))$, where $\tilde{H}$ is a composite channel gain, P is the total transmit power, M is number of subarrays of antenna arrays, with the optimal transmission being $C_{OPT} = \max(C_{rankM}, C_{rank1})$.

BRIEF DESCRIPTION OF DRAWINGS

These and other advantages of the invention will be apparent to those of ordinary skill in the art by reference to the following detailed description and the accompanying drawings.

DETAILED DESCRIPTION

Figure 1:
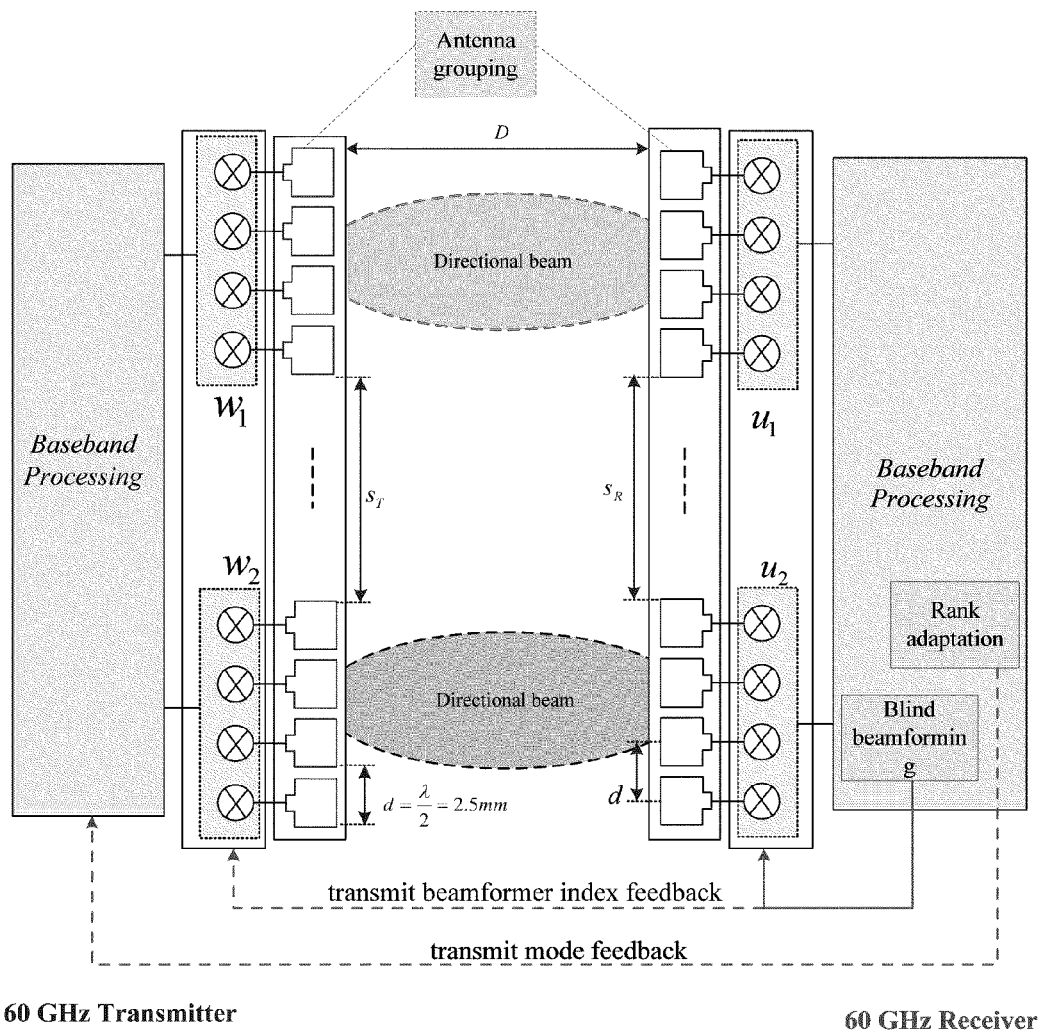
FIG. 1 is a diagram of an exemplary 60 GHz wireless system with antenna grouping, blind beamforming and rank adaptation, in accordance with the invention.

The invention is directed to MIMO transmission with rank adaptation in the 60 GHz wireless radio link, which can leverage both high rank MIMO spatial multiplexing gain and rank−1 beamforming advantage to dramatically increase system throughput.

The invention is based on geometrical approach, entailing a system architecture (see FIG. 1) with antenna grouping and rank adaptation capability for 60 GHz transmission. Specifically, the transmit and receive (Tx-Rx) antenna arrays, $W_1 \ldots W_2, U_1 \ldots U_2$, linked by directional beams are grouped into a number (M) of subarrays with a predetermined subarray separation. The minimum number of transmission Tx and receiver Rx subarrays determines the highest rank that the MIMO channel can support. Each subarray consists of a traditional half-wavelength spaced d linear array. This architecture potentially releases the rank deficient 60 GHz LoS channel to a less correlated channel and provides high rank MIMO transmission and rank adaptation capability.

For the 60 GHz system with the proposed invention, after a random drop of geometrical settings 201, the invention applies enhanced blind beamforming 202 based on stochastic gradient algorithm (SGA) for the inner-subarray antennas, which does not require channel state information (CSI) at the transmitter or receiver. Then, the composite (M-by-M) MIMO channel, as a joint effect of TX-RX beamforming and the channel impulse response, can be estimated to capture the equivalent channel characteristic 203. Finally, MIMO transmission with rank adaptation is performed by adaptively selecting the better scheme out of the high-rank spatial multiplexing and the rank−1 beamforming.

Referring again to FIG. 1, both the transmitter and receiver antenna array are grouped into M subarrays. Each subarray consists of a linear array of elements with half-wavelength separation. For simplicity, we assume M=2 in the architecture but the proposed approach can be readily extended to any number of M subarrays, with any number of element in each subarray.

For the proposed inventive system with delay-and-sum (DAS) beamforming, the optimal transmit inter-subarray spacing $S_T$ and receive antenna spacing $S_R$ achieving a capacity-maximizing rank−2 MIMO transmission is given by $$s_R \approx (2p+1) \frac{D\lambda}{2s_T + \left(\frac{N_t}{2} - 1\right)\lambda}.$$

Where D is distance between transmitter and receiver, λ is the carrier wavelength, p is non-negative integer number, and $N_t$ is the number of transmit antennas.

Based on the above optimal geometrical criteria for high rank LoS creation in the system with antenna grouping, a subarray separation of 5~10 cm is the practical setting that could achieve optimal high rank MIMO transmission. This provides a guideline for practical antenna array design to reserve the high rank MIMO transmission capability. Within each subarray, beamforming is used to improve link signal-to-noise-plus-interference-ratio (SINR) and geometrical misplacement robustness. Among the subarrays, the high rank MIMO link can be formed based on the optimal geometrical criteria and LoS channel characteristic.

Figure 2:
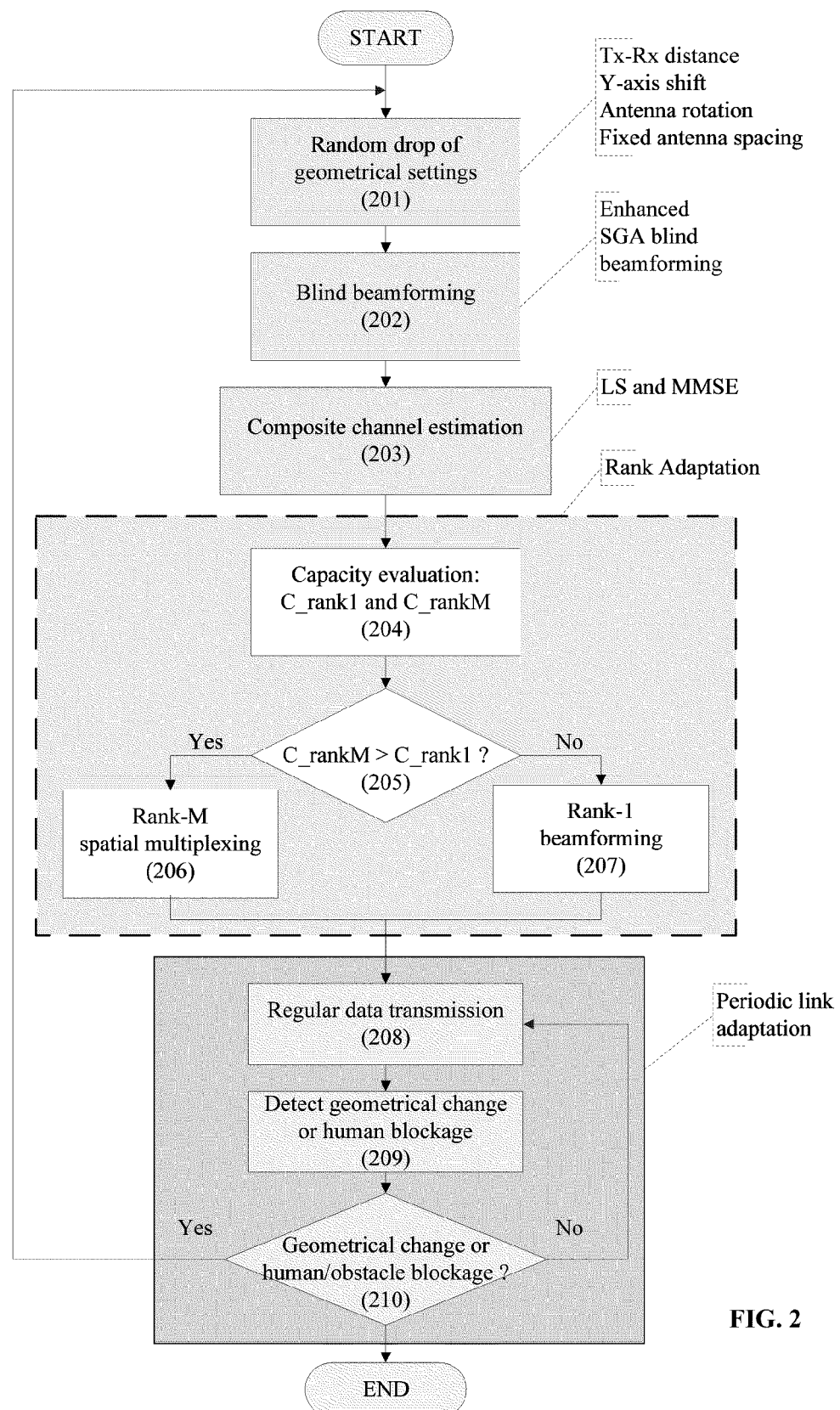
FIG. 2 is a flow diagram of a MIMO transmission with rank adaptation, in accordance with the invention.

The process to implement the MIMO transmission with rank adaptation in practical 60 GHz system, in accordance with the invention, is diagramed in FIG. 2.

For any given random drop 201 of a practical system, we have a layout realization in terms of Tx-Rx horizontal distance (D), relative vertical shift and relative angular rotation. This could be in the stage of initial system setup or power-on. The inventive approach is to find out the optimal transmission mode (rank−1 beamforming and high rank spatial multiplexing) giving higher system throughput without any knowledge of the actual geometrical placement.

First, there is applied an enhanced SGA based blind beamforming 202 to find out the optimal transmit and receive beamformers for each subarray pair. By designing the perturbation vectors in an efficient way, the blind beamforming performance is improved in the sense that it works with randomly initialized beamformers and achieves the close-to-optimal performance within a few number iterations.

The inventive approach estimates the composite channel gain to perform rank adaptation 203. The composite channel, as a joint effect of Tx-Rx beamforming and the channel impulse response, is a MIMO channel with a much smaller dimension (2×2 for rank 2 transmission). Instead of estimating the original $N_t \times N_r$ channel coefficients, an M×M composite channel is estimated with much reduced complexity and higher accuracy due to the improved signal-to-noise-ratio contributed by the beamforming.

Then, capacity evaluation 204 as well as rank adaptation 205-207 based on the composite channel is performed. With the composite channel gain $\tilde{H}$ obtained at the receiver, the transmission scheme can be adaptively chosen from either the high rank spatial multiplexing or the rank−1 beamforming whichever gives higher system throughput. The capacity for the high rank spatial multiplexing and rank1 beamforming is respectively given by $$C_{rankM} = \log_2\left(\det\left(I + \frac{P}{M}\tilde{H}\tilde{H}'\right)\right)$$

and $C_{rank1} = \log_2(1+P|\tilde{u}\tilde{H}\tilde{w}'|^2))$, where P is the total transmit power. The optimal transmission scheme is then given by $C_{OPT} = \max(C_{rankM}, C_{rank1})$.

A regular data transmission stage 208 is then followed with the selected transmission mode. For high rank transmission, the conventional MIMO transmission and detection with rank-M can be used. For rank−1 beamforming, a quantized feedback of the transmit beamforming vector can be sent to the transmitter. Analysis and results confirm that at some locations and transmit power settings, rank 1 beamforming offers higher throughput, while at other locations and transmit power settings, higher rank spatial multiplexing gives higher throughput. The MIMO transmission with rank adaptation allows the 60 GHz system to reap the throughput gain from spatial multiplexing and beamforming at any physical placement.

Finally, if there is any change in existing geometrical setting or there is observable human/obstacle blockage, 209, 210, the whole procedure shall be repeated to re-determine the beamforming weights and the optimal transmission mode. We propose a procedure called periodic link adaptation to deal with the potential geometrical change and/or human blockage effect. Specifically, the receiver periodically detects the geometrical change or blockage effect based on the received signal strength. If the signal strength drops over 20 dB for continuous 4~5 frames, the transmission adaptation procedure shall be reset and restarted until a new transmission scheme is determined, as shown in FIG. 1.

Figure 3:
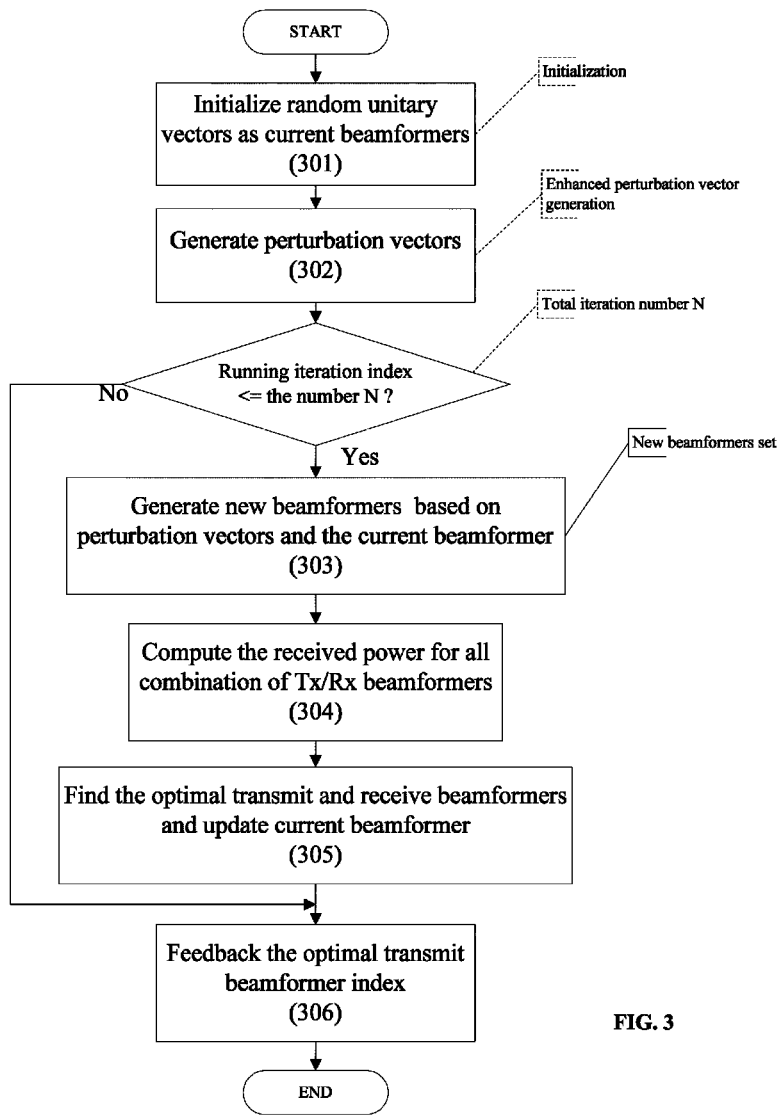
FIG. 3 is a flow diagram of enhanced stochastic based blind beamforming, in accordance with the invention.

Referring now to the flow diagram of FIG. 3, there is shown an enhanced stochastic gradient algorithm based blind beamforming, in accordance with the invention. After initialization of random unitary vectors as current beam formers 301, enhanced perturbation vectors are generated 302 then a total N iteration is run. The iteration run generates new beamformers based on perturbation vectors and the current beamformer 303, then the received power for all combination of Tx/Rx beamformers is determined 304, and the optimal transmit and receive beamformers are found and the current beamformer is updated 305. Lastly, the optimal transmit beamformer index is a feedback to the transmitter side (see FIG. 1).

As can be seen, from heretofore, the invention applies an enhanced adaptive transmit and receive beamforming based on stochastic gradient algorithm (SGA) for the sub-arrays, which does not require the channel state information of the sub-arrays. For any given selected pair of Tx-Rx subarrays, the transmit and receive beamformer can be independently determined by a certain criteria such as maximizing the received SNR or signal power. For practical implementations, a low rate feedback channel is needed to inform the transmitter the selected transmit beamformer. At the final iteration, the optimal beamformers are obtained and shall be applied in the corresponding subarrays.

The present enhanced SGA based blind beamforming is an efficient way to generate the perturbation vectors set, with which the SGA blind beamforming can approach the optimal beamformers with a very few number of iterations for any random initialization start.

It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A wireless system comprising: a transmitter with a baseband processor responsive to groups of transmitter antenna arrays for communicating over directional beams; and a receiver with a baseband processor responsive to groups of receiver antenna arrays for communicating with said transmitter over said directional beams, said receiver including both a rank adaptation providing a transmit mode feedback to said transmitter and a blind beamforming providing a transmit beamformer index feedback to said transmitter and receiver groups of antenna arrays; wherein said blind beamforming comprises generating enhanced perturbation vectors, an iteration to generate new beamformers responsive to said perturbation vectors and a current beam beamformer, and determining a received power for all combination of transmitter and receiver antenna beamformers responsive to said new beamformers.

2. The system of claim 1, wherein said blind beamforming comprises a stochastic gradient algorithm based blind beam forming.

3. The system of claim 1, wherein said blind beamforming comprises determining optimal transmit and receive beamformers for updating said current beamformer.

4. The system of claim 1, wherein said rank adaptation is responsive to a composite channel estimation with reduced complexity and higher accuracy from improved signal-to-noise-ratio contributed by joint effect of transmitter-receiver beamforming.

5. A method for wireless communication comprising the steps of:
communicating over directional beams by a transmitter with a baseband processor responsive to groups of transmitter antenna arrays for; and
communicating with said transmitter over said directional beams by a receiver with a baseband processor responsive to groups of receiver antenna arrays, said receiver including both a rank adaptation providing a transmit mode feedback to said transmitter and a blind beamforming providing a transmit beamformer index feedback to said transmitter and receiver groups of antenna arrays;
wherein said blind beamforming comprises generating enhanced perturbation vectors, an iteration to generate new beamformers responsive to said perturbation vectors and a current beam beamformer, and determining a received power for all combination of transmitter and receiver antenna beamformers responsive to said new beamformers.

6. The method of claim 5, wherein said blind beamforming comprises a stochastic gradient algorithm based blind beam forming.

7. The method of claim 5, wherein said blind beamforming comprises determining optimal transmit and receive beamformers for updating said current beamformer.

8. The method of claim 5, wherein said rank adaptation is responsive to a composite channel estimation with reduced complexity and higher accuracy from improved signal-to-noise-ratio contributed by joint effect of transmitter-receiver beamforming.

9. The method of claim 5, wherein said rank adaptation comprises a capacity evaluation responsive to a composite channel gain obtained at said receiver, said transmission being adaptively chosen from one of a high rank spatial multiplexing and a rank-1 beamforming whichever gives higher throughput.

10. The method of claim 9, where said capacity for said high rank spatial multiplexing and said rank1 beamforming is respectively given by $$C_{rankM} = \log_2\left(\det\left(I + \frac{P}{M}\tilde{H}\tilde{H}'\right)\right)$$

and $C_{rank1} = \log_2(1+P|\tilde{u}\tilde{H}\tilde{w}'|^2))$, where $\tilde{H}$ is a composite channel gain, P is the total transmit power, M is number of subarrays of antenna arrays.

11. The method of claim 10, wherein said optimal transmission follows from the relationship $C_{OPT} = \max(C_{rankM}, C_{rank1})$.

12. The method of claim 10, wherein said optimal capacity for said high rank spatial multiplexing comprises a spectral efficiency evaluation based on a practical receiver filtering responsive to a composite channel gain obtained at said receiver, said transmission being chosen from one of a high rank spatial multiplexing and a rank-1 beamforming whichever gives a higher throughput.

13. The method of claim 12, where said practical receiver filtering comprises one of a minimum mean square error (MMSE) receiver, a zero-forcing receiver, or any other practical receivers.

14. A wireless system comprising:
a transmitter with a baseband processor responsive to groups of transmitter antenna arrays for communicating over directional beams; and a receiver with a baseband processor responsive to groups of receiver antenna arrays for communicating with said transmitter over said directional beams, said receiver including both a rank adaptation providing a transmit mode feedback to said transmitter and a blind beamforming providing a transmit beamformer index feedback to said transmitter and receiver groups of antenna arrays;

wherein said rank adaptation comprises a capacity evaluation responsive to at least one of composite channel gain and capacity prediction obtained at said receiver, said transmission being adaptively chosen from one of a high rank spatial multiplexing and a rank-1 beamforming whichever gives higher throughput; and where said capacity for said high rank spatial multiplexing and said rank1 beamforming is respectively given by $$C_{rankM} = \log_2\left(\det\left(I + \frac{P}{M}\tilde{H}\tilde{H}'\right)\right)$$

and $C_{rank1} = \log_2(1+P|\tilde{u}\tilde{H}\tilde{w}|^2))$, where $\tilde{H}$ is a composite channel gain, P is the total transmit power, M is number of subarrays of antenna arrays.

15. The system of claim 14, wherein said optimal transmission follows from the relationship $C_{OPT} = \max(C_{rankM}, C_{rank1})$.

16. The system of claim 14, wherein said optimal capacity for said high rank spatial multiplexing comprises a spectral efficiency evaluation based on a practical receiver filtering responsive to a composite channel gain obtained at said receiver, said transmission being chosen from one of a high rank spatial multiplexing and a rank-1 beamforming whichever gives a higher throughput.

17. The system of claim 16, where said practical receiver filtering comprises one of a minimum mean square error (MMSE) receiver, a zero-forcing receiver, or any other practical receivers.

* * * * *